United States Patent Office 2,950,007
Patented Aug. 23, 1960

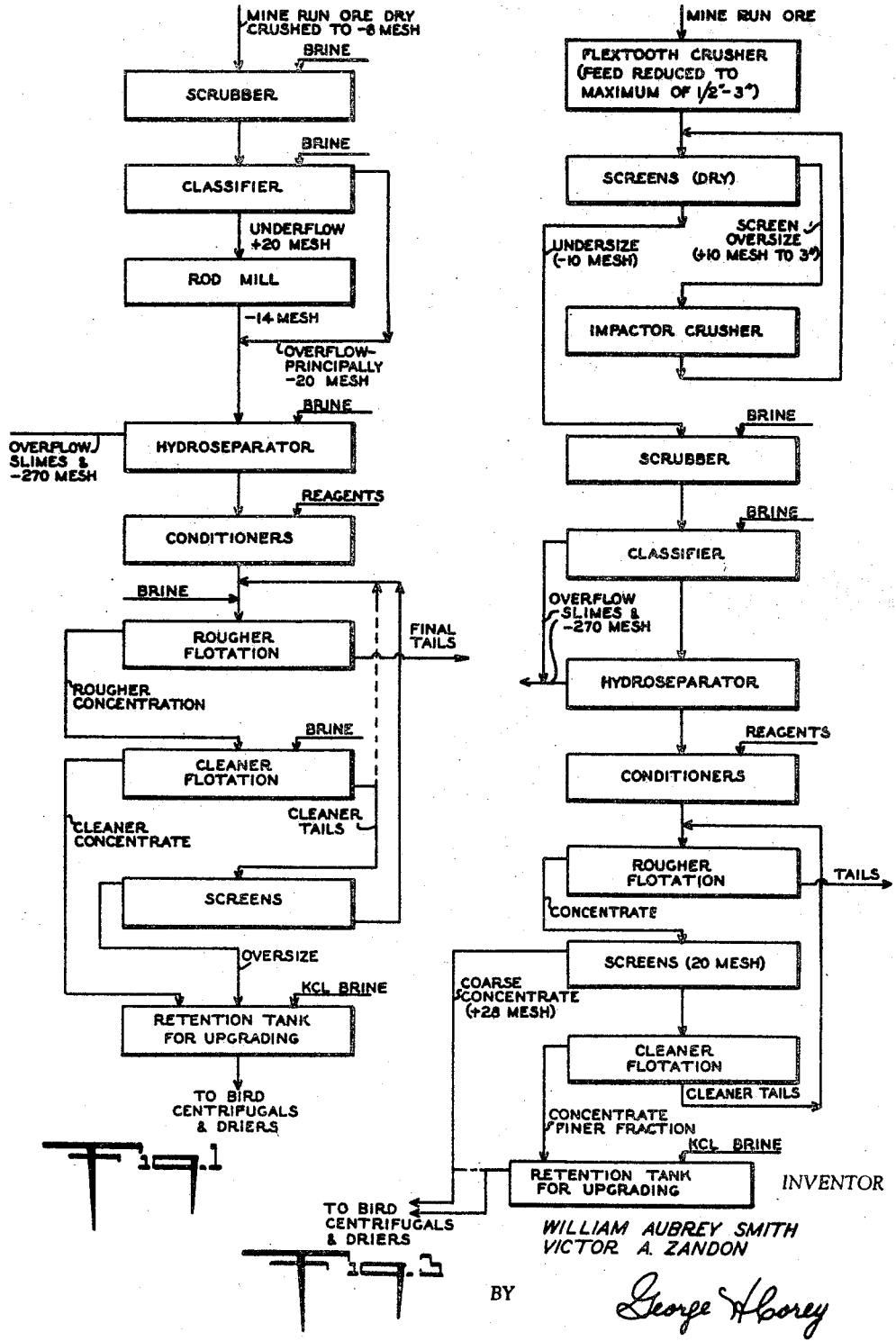

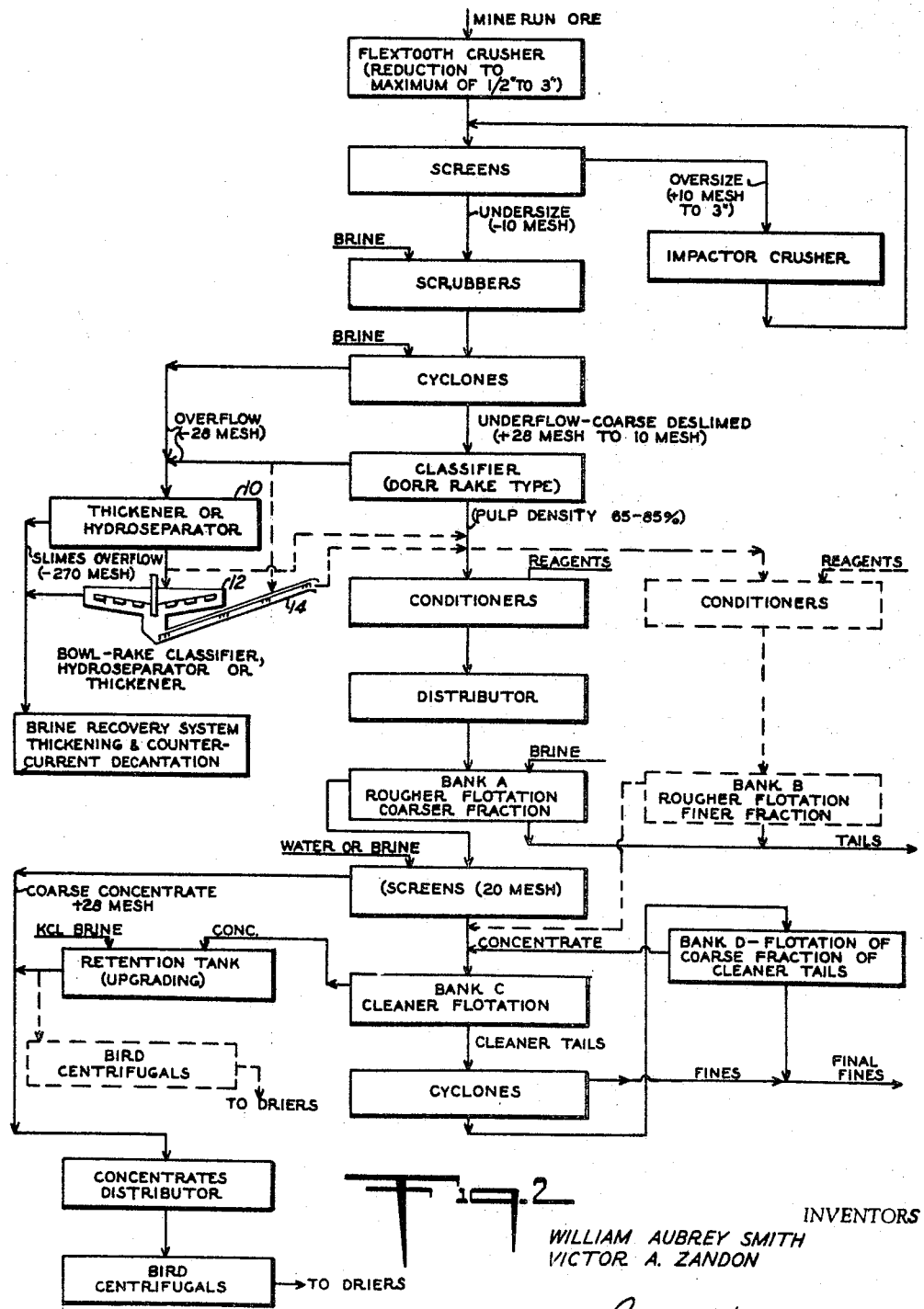

2,950,007

CONCENTRATION OF POTASH ORES

William Aubrey Smith and Victor A. Zandon, Carlsbad, N. Mex., assignors to American Metal Climax, Inc., a corporation of New York Filed Mar. 18, 1957, Ser. No. 646,862

13 Claims. (Cl. 209—166)

This invention relates to the treatment of potash ores containing sylvite in association with halite as the principal gangue constituent for the purpose of recovering the sylvite largely free from gangue constituents and in a commercially usable form. The invention has for a more particular and representative application the separation and concentration of the sylvite value of sylvinite ores of which a typical example is the sylvinite ore found in the Carlsbad district of New Mexico.

The separation and recovery of the sylvite value of these ores in concentrated form is at present usually brought about by resort to a flotation treatment wherein, after preliminary reduction to a suitable fineness and suspension in a brine of the water soluble ore constituents, either the sylvite is floated and the halite constituent is depressed or, vice versa, the halite constituent is floated and the sylvite is recovered as the tailing.

Since these ores as they normally occur in nature contain small but nevertheless objectionable amounts of insoluble clay-like minerals that interfere with the concentration of the sylvite by flotation and similar concentrating procedures, it is necessary, in preparing the ore for the flotation treatment, to subject it to a preliminary desliming treatment involving suspension in a brine constituted of the water-soluble ore constituents and then pass the resulting pulp through suitable scrubbing and agitating devices designed to free the ore particles from as much of the clay-like minerals present as is feasible.

In order to avoid installation of an inordinate amount of equipment for mechanical desliming and also to avoid use of unduly large amounts of brines in the circuits, it has been found more practical to carry the mechanical desliming to a point short of that necessary to insure an optimum flotation result, and then subject the pulp to treatment with a chemical slime control agent adapted to prevent the residual clay-like slimes from interfering with the flotation action. However, in any case it has been considered necessary to use large volumes of brines in the preliminary treatment of the ore to prepare it for the concentration treatment, and this involves important items of operating expense for pumping the brines and operating the agitating and classifying devices that are customarily used.

As these operations are conducted there is also a certain loss of potash values in the form of fine water-soluble particles of the ore which overflow along with the clay slimes during the mechanical desliming stage of the process.

It has also been the general practice in reducing sylvinite and similar potash ores to a suitable fineness for flotation to subject them to dry crushing to a fineness such that they may be readily handled in the wet way, say, to −6 mesh, and then to suspend the ore in a suitable brine and feed the resulting pulp to a scrubber of a conventional type where it is agitated in the brine suspension to promote the separation of the sylvite and halite particles from one another and also to loosen and disperse the clay impurities that are attached to the surfaces of the ore particles. From the scrubber the suspension is then discharged to a classifier where additional brine is added and a separation according to particle size is effected. The underflow containing the bulk of the feed and usually having a particle size range of from about 6 mesh down to 20 mesh, then is fed to a rod mill where it is ground under wet conditions to suitable fineness for the flotation operation.

Usually the discharge from the rod mill has been regulated to insure that all or nearly all of the ore has been reduced to −14 mesh and the larger part has been reduced to −20 mesh. The overflow from the classifier, usually regulated so as to include substantially only particles of a fineness similar to the fineness of the ore particles discharged from the rod mill, customarily is combined with the rod mill discharge and the recombined feed is then passed to a hydroseparator wherein the extremely fine ore particles, e.g., those −270 mesh, and the freed clay slimes are separated as the overflow and the remainder is passed to the conditioners for the flotation treatment.

Although the above practices are being followed on a large scale in the potash industry, they still leave much to be desired both from the standpoint of recovery of the potash values and the type of product produced. The involved treatments also represent very important items of expense by way of power for operating pumps and other equipment.

Furthermore, with regard to the type of product produced, there is a present need to recover a higher proportion of the potash values in relatively coarse form in order to meet the demands of the users, and also to reduce the proportion of finer particles and especially the proportion of the very fine size particles, i.e., −65 mesh. Although various improvements have been made in this respect, there still remains room for much improvement.

It is an object of the present invention to bring about substantial reduction in the costs of recovering sylvite from the potash ores.

It is a further object of the invention to recover a higher proportion of the potash product in the coarser sizes demanded by an important part of the trade, particularly the fertilizer industry.

It is another object of the invention to reduce the proportion of very fine size particles (−65 mesh) as well as to reduce the overall proportion of particles that are too fine to be acceptable as a part of the coarse product that is in greatest demand. At the present time this means reducing the proportion that is −28 mesh.

It is another object of the invention to bring about improvements in the mechanical desliming treatment of the ore preparatory to the conditioning for the flotation operation.

It is a further object of the invention to effect economies in the flotation operation by screening out a coarser fraction of the rougher concentrate which is of sufficiently high grade not to require cleaning, thereby reducing the amount of the flotation feed that is passed through the cleaner stage of the flotation operation.

It is a still further object of the invention to bring about improvement in the overall recovery of the potash content of the ores undergoing treatment.

Other objects and advantages of the present invention will be brought out in the following description taken in conjunction with the appended drawing wherein:

Fig. 1 represents a flow sheet setting out a typical prior art operation;

Fig. 2 represents a flow sheet whereon is indicated the preferred form of the general plant layout used in practicing the present invention; and Fig. 3 represents a flow sheet showing a modified form of plant layout that may be used in practicing the invention.

One of the important aspects of the present invention and one which makes possible an important advance over the prior practices of the art resides in the substitution for the conventional wet grinding operation previously conducted in a rod mill, of a special type of dry grinding or more accurately dry crushing operation, which will be referred to hereinafter as closed circuit impact crushing, and the introduction of the crushing step in advance of the initial scrubbing operation. In other words, the ore previously brought to a suitable size, by passing same in dry form through a flextooth crusher or similar crushing means, is then fed into an impact crusher wherein the ore particles are subjected to a shattering action by being brought more or less violently into contact with hammers or by being thrown against more or less planar surfaces of the crushing means so that the reduction of the particle size is accomplished wholly or largely through impact as distinguished from attrition or a rubbing action such as is produced in a rod mill and similar types of grinding mills. A type of crusher which we have found to work very satisfactorily for our purposes is the Pennsylvania Impactor manufactured by the Pennsylvania Crusher Co. Others operating on similar principles are known and may be used.

In order to insure the maximum advantages from the dry impact crushing step, it is important to regulate the size of the impactor feed so that, on the one hand, it will not be so coarse as to cause undue difficulties in handling through screening or conveying equipment or in moving it to or from any intermediate storage in the crushing plant, and, on the other hand, it should not be so fine as to produce an excessive amount of finer particles. Whatever the type of crushing equipment (flextooth, hammermill or rolls) used, to prepare the impactor feed, that feed should not be reduced to a top size so fine that an undue amount of −28 mesh particles is produced in this stage of the reduction of the ore. By way of example, when using a flextooth crusher to prepare the impactor feed, the size of the flextooth product should be regulated so as not to be so small, say, finer than ½″, that a high degree of crushing is accomplished in the flextooth crusher; this because of the inherent tendency of such equipment to produce fines, i.e., particles −28 mesh. We have found that a flextooth product as fine as 1″ does not produce an excessive amount of −28 mesh particles and that a flextooth product up to 3″ size can be handled mechanically in the impact crushing stage without undue mechanical difficulties.

The impact crushing operation is conducted in the dry way and a closed circuit is maintained by the provision of a screen or screens for receiving the crusher discharge and a conveyor for returning oversize material to the crusher. The screens are selected as to fineness so as to permit the product that has been reduced to suitable size for the further treatment to pass through while retaining the coarser material which is then recycled through the crusher. The ore as it is passed from the impact crushing step is left somewhat coarser than was formerly considered practical in preparing the ore for a flotation separation. We have found that if the ore is only reduced to a maximum size of around −10 mesh it still may be readily handled in the flotation step, and it may even be somewhat coarser if the flotation feed is divided into a coarser and a finer fraction and these fractions are separately conditioned and floated.

It has been our observation that by employing dry impact crushing of the ore to the desired size for the flotation operation, there is produced a much smaller proportion of extremely fine particles, i.e., −270 mesh, of the sylvite and halite constituents of the ore which tend by themselves to form slimes that would interfere with the flotation operation unless removed. We have further found that by employing dry impact crushing with closed circuit screening the proportion of finer particles within the flotation size range is very materially reduced. To be more specific, the proportion of ore particles (both sylvite and halite) of the smaller sizes, say less than 28 mesh size and particularly particles −65 mesh size, is very considerably smaller than is the case when wet grinding in a rod mill is employed. This is important from the standpoint that the concentration of the sylvite to an acceptable grade for the market is made much easier and also a higher proportion of the sylvite may be recovered in the form of a coarser product. The production of a more uniform flotation feed containing less fines has the further importance that it contributes considerably to the reduction of upgrading water, or KCl brine, that is required to dissolve out fine halite particles carried over in the flotation concentrate. In addition, it has been found that the clay-like impurities that are freed during the crushing step are more readily separated from the ore particles than has been the case heretofore. The reduction in fines and the easier separation of the clay-like impurities may be explained as due to minimizing of attrition or rubbing action such as normally occurs in a wet grinding rod mill operation.

Although impact grinding or crushing has been practiced for many years, this type of crushing has not been heretofore practiced on any ore, so far as the applicants are aware, for the purpose of reducing it to suitable size for flotation without further grinding in the wet way by an attrition method such as in a rod mill. We attribute the novel results obtained in using impact crushing in preparing a flotation feed from potash ores to the peculiar characteristics of such ores, especially those of the sylvinite type, and also to the fact that the impact crushing operation is carried on in the dry way. Sylvinite ores constitute mixtures of sylvite and halite crystals, and we have observed that the cleavage strength of the bonds between the separate crystals of these minerals is less than that across the individual crystals and that, therefore, when the dry ore is fed to an impact crusher there is a pronounced tendency for lumps or larger particles of the ore to break along the weakest planes at the boundaries of the crystals and not across the crystals. There is also a lessened tendency to abrade material off the surfaces of the particles.

Following the dry impact crushing operation the dry ore discharge is pulped with brine and fed to a suitable scrubber, which may be of any conventional type, e.g., a horizontal rotatable drum provided with lifters or a vertical cylindrical tank provided with an impeller type agitator. Usually the amount of brine added to the scrubber should be of an order sufficient to produce a pulp carrying 50–60% solids.

According to our preferred procedure, the pulp is passed from the scrubber to cyclone separators where additional brine is added to lower the pulp density to about 25–30% solids. The underflow from the cyclones carrying the coarser and major part of the feed is passed to a classifier, preferably of the Dorr rake type, where additional brine may and usually will be added. The overflow is passed to a thickener or a hydroseparator. Although the separation in the cyclones may be regulated to a different point as to particle size, we prefer to regulate the overflow discharge to carry over the greater part of the —28 particles.

Likewise, the overflow discharge from the classifier is regulated to carry over the greater part of the —28 particles and this flow may be either joined with the overflow from the cyclones or passed directly to the thickener or hydroseparator 10. Alternatively, the overflow from the classifier may bypass the thickener or hydroseparator 10 receiving the overflow from the cyclones and be led directly to the bowl classifier 12 or other final stage of mechanical desliming and thickening hereinafter mentioned. The underflow from the Dorr classifier and which is of a relatively high pulp density, say 65 to 85% solids, is led directly to the conditioners.

The use of dry impact crushing of the ore preparatory to the mechanical desliming and flotation steps is found to have the further advantage that it accentuates the known friability of the halite constituent of a halite-sylvite potash ore. In other words, in the subsequent classification of the crushed ore into a finer and coarser fraction in the mechanical desliming stage there will be some increase in the proportion of sylvite with respect to the halite present in the coarser fraction as compared to the proportions of these constituents in the ore as mined, and conversely there will be some decrease in the proportion of sylvite with respect to halite present in the finer fraction.

Returning now to the general description of the process as outlined in the flow sheet set out in Fig. 2, the underflow from the hydroseparator 10 is fed to a bowl classifier 12, or other suitable partial dewatering or thickening device, where a further separation of slimes, both ore particles of, say, —270 mesh and clay impurities, is effected. The overflow thereof is joined with the overflow from the hydroseparator 10 and passed to a brine recovery system which may include thickeners from which fine water soluble solid particles of the ore are recovered as an underflow and introduced to a counter current decantation system where water is added for the purpose of preparing brine from these recovered ore particles for use in the operation. When the bowl classifier is used it is preferably provided with an upwardly inclined rake discharge 14 so as to cause the underflow from it to have a relatively high density. However, this density need not be so high as that of the underflow from the Dorr classifier.

The introduction of the bowl classifier or a similarly functioning device into the circuits brings about two advantageous results. First, it makes it easier to regulate to a relatively high density the pulp fraction that is recovered from the overflows from the cyclones and the Dorr classifier. Secondly, by operating the bowl classifier so as to produce an underflow of high pulp density, the proportion of slime remaining in such underflow is further reduced in accordance with the reduction of the brine content of such underflow.

According to a modification indicated by the dotted line flow on Fig. 2, the use of the second stage of mechanical desliming of the overflows of the cyclones and the classifier may be dispensed with, for example, when the initial proportion of slimes is relatively low, either by passing the bowl-rake classifier 12 or omitting this device altogether. The flow sheet arrangement also permits of a further modified operation wherein the overflow from the cyclones and the overflow from the classifier are treated in separate circuits, the former overflow being treated in the thickener 10 with the underflow thereof then joined with the underflow from the classifier, and the overflow from the classifier being passed directly to the bowl-rake classifier 12 or another desliming and thickening device at that location, with the underflow thereof being passed to the conditioners.

Instead of recombining the pulp fraction representing the underflow from the Dorr classifier, consisting of particles of a coarser size range, with the pulp fraction (or fractions) constituting the underflow from the bowl classifier and optionally also a separate fraction constituting the underflow from the thickener 10, the fractions, or more especially the coarser fraction and the finer pulp fractions, advantageously may be separately conditioned and then either separately floated or combined and then passed to the flotation cells as a single feed. The general advantages of separating the flotation feed into fractions, one consisting of particles of a coarser size range and the other of particles of a smaller size range and separately conditioning those fractions, and also optionally separately floating those fractions, have been disclosed in the copending application Serial No. 630,250, filed December 24, 1956 (now Patent No. 2,837,297, dated May 27, 1958), as a continuation in part of Serial No. 288,962, filed May 20, 1952, now abandoned, by one of the present inventors (William Aubrey Smith), Vernon L. Mattson and Gene Meyer. However, in its broader aspects the present process is not confined to an operation wherein the finer and the coarser fractions of the feed are separately conditioned or separately conditioned and floated.

Usually a slime control agent is added to the pulp at a point in its progress from the classifier to the conditioner or at the conditioner at a point in its treatment prior to the point of addition of the amine or other cationic collecting agent. Any suitable slime control agent may be used and the amount thereof will be regulated according to the amount of clay slime remaining in the pulp on conclusion of the mechanical desliming treatment. The polyglycols and their ethers disclosed in U.S. Patent No. 2,724,499, dated Nov. 22, 1955, are mentioned by way of example.

It will be seen from the above and from inspection of the flow sheet of Fig. 2 that the process provides for a plurality of mechanical desliming treatments of the finer fraction of the feed separately from the coarser fraction. We find that this makes for a more efficient desliming than is the case when the mechanical desliming treatments are applied to the feed only while the finer and coarser particles are intermingled. It also contributes to an improved flotation result when using a given amount of slime control reagent. In either case the process as outlined above in connection with Fig. 2 insures a more efficient mechanical desliming of the ore with consequent savings in the amount of slime control reagent required to be added to insure a satisfactory flotation result and a normal or reduced consumption of amines or other cationic collecting agent.

A further important result of resorting to dry impact crushing and closed circuit screening of the discharge from the crushing mill resides in the fact that the resulting flotation feed is more uniform in size, both in the coarser size range and the finer size range, than is ordinarily the case in the prior practice. This greater uniformity of particle size is advantageous from the standpoint of the improvement in the flotation results and also from the standpoint that more desirable products are obtained.

We have found that we can realize the further important result that a much larger proportion of the sylvite is recovered in the form of a coarse fraction. For example, when the separation into a coarse and a finer fraction is made on the basis that the coarse fraction shall include substantially all particles +28 mesh in size, we have found that approximately 45% of the total recovery from the flotation treatment is in the form of particles 28 mesh and larger. Oversize particles, that is, particles +9 mesh, are practically eliminated. This is another advantage in that there is less danger of loss of such particles in the tailings when the flotation is carried on with a cationic collector and the sylvite is floated away from the halite. This coarser fraction yield is to be compared with a recovery of 30% falling within the size range 8–28 mesh which was what was formerly obtained with wet grinding in a rod mill.

The two fractions resulting from the split circuit desliming treatments hereinbefore described especially lend themselves to separate conditioning with collecting agents specially selected with reference to their action on the coarser fraction in the one case and the finer fraction in the other with consequent improvement in the flotation result and savings in quantities of the collecting agents required. The separation of the feed into a finer and a coarser fraction and the conditioning of these fractions with collecting agents specially selected with reference to their suitability for collecting coarser and finer particles, respectively, is disclosed and claimed broadly in the aforementioned copending application Serial No. 630,250, and we make no broad claims herein to that procedure.

The advantages flowing from the use of impact crushing in a closed circuit with screens are not confined to use in a process wherein the screened crusher discharge is separated into separate fractions in carrying on the mechanical desliming steps and optionally also separate conditioning and flotation of these fractions. A very substantial increase in the proportion of a coarser product may be obtained by substituting the impact crushing step in the circuit formerly employed and without separate flotation of a finer and a coarser fraction. Such a flow sheet is shown in Fig. 3 where the dry impact crushing step is shown as substituting for the rod mill in a circuit otherwise similar to that shown in Fig. 1, except for the further modification that the first scrubber and the first classifier are introduced after the impact crusher whereas in Fig. 1 these units precede the rod mill. With such a circuit, a recovery of 45% of coarser particles, that is, 28 mesh and larger, has been obtained.

A further and important advantage realized by use of dry impact crushing in association with a screen receiving the crusher discharge and from which the oversize is returned to the crusher has to do with the substantial reduction in the loss of sylvite that has heretofore occurred in the upgrading of the concentrate by washing on screens or otherwise treating the concentrate with water to dissolve out halite particles carried over therewith in the flotation operation. Still further, we have found that the use of impact crushing and the production of a more uniformly sized feed even when introduced into the older type flow sheet shown in Fig. 1 in place of the wet rod mill grinding step, but without resort to separate desliming, conditioning and flotation of a finer and a coarser fraction, has nevertheless resulted in very important savings in the quantity of water required to be used in upgrading the concentrate and has also produced a corresponding increase in the amount of sylvite recovered and which would otherwise have been dissolved and carried away with the wash waters. This reduction in losses of sylvite in a typical plant operation involving the treatment of 4,000 tons of sylvinite ore a day makes for a recovery of some 8–10 tons of sylvite per day that would otherwise be dissolved in the wash waters. Furthermore, the savings in pumping costs in handling the larger volumes of water that would otherwise be required are considerable.

When the treatment of the ore following the closed circuit dry crushing step is further modified so as to be carried out according to the preferred embodiment of the process as described in relation to Fig. 2, that is, with the mechanical desliming carried on as a split circuit operation and with separate conditioning and separate flotation of a finer and coarser fraction whereof the dividing line as to particle size is maintained at approximately 28 mesh, we have found that it is possible to reduce still further the amount of fresh water added for makeup purposes and in effecting upgrading of the concentrate to the degree required to meet the commercial requirements. Under optimum conditions we have obtained results which indicate that, instead of adding some 135–140 gallons of fresh water per minute for upgrading purposes and to maintain the brine requirements of the system when treating 4,000 tons of ore per day according to the older practice as outlined in the flow sheet of Fig. 1, it is possible to reduce the amount of fresh water added to the system to the order of 30 gallons per minute with a resultant improvement in the recovery of the sylvite of some 12–15 tons per day. The importance of reducing the amount of water added to the system for upgrading and make-up purposes will be further appreciated when it is kept in mind that each gallon of water will dissolve one pound of KCl in being converted to a brine of the composition required in pulping the ore. This dissolved KCl can be recovered only by resort to evaporation and crystallizing procedures which are usually not sufficiently economic under present day large scale operations in the Carlsbad district.

As shown more particularly in that part of the flow sheet of Fig. 2 which follows the separate conditioning steps, the preferred embodiment of our invention includes as a further departure from the prior practice what we believe to be a novel procedure as regards the flotation and cleaning steps which leads to further improvement in the overall results. As will be observed from Fig. 2, the separately conditioned coarser and finer fractions are passed through separate banks of flotation cells which are respectively designated as "Rougher Flotation—Bank A" and "Rougher Flotation—Bank B." The concentrate from the coarser fraction which is treated in the flotation cells designated "Bank A" is discharged to a screen where it is subjected to wet screening at a suitable mesh selected with a view to allowing any finer sylvite and halite particles to pass through while retaining the coarser sylvite particles. Since the undersize from this screen is then passed to a cleaner flotation operation, the screen size may be varied considerably at this point. We have found that a 20-mesh screen usually insures a separation at about 28 mesh of a coarser fraction of the rougher concentrate at this point and that this coarser oversize fraction does not require a cleaning flotation or any treatment with water or a KCl brine to bring the grade up to the commercial standard, i.e., to the equivalent of 60% $K_2O$ or better. The concentrate oversize passes from the screen directly to a concentrate distributor tank from which it is fed to a suitable de-watering means, e.g., Bird centrifugals, and then to dryers. The undersize of the rougher concentrate which passes through the screen is led to a bank of cleaner flotation cells, Bank C in Fig. 2.

As further shown in Fig. 2 the separately conditioned finer fraction of the ore pulp, i.e., the fraction consisting of particles passing a 28 mesh screen but larger than 270 mesh, is passed through Rougher Bank B. The concentrate recovered therefrom is also passed to the cleaner flotation cells designated Bank C, in this case in bypass relation to the screen. The tails from the cleaning operation are passed to a cyclone separator where a separation between the finer and the coarser tails is effected with the coarser tails being passed in a partially de-watered state on to a second bank of cleaner flotation cells designated Bank D where they are subjected to a further flotation. The concentrate recovered in this flotation operation is recycled and combined with the feed to the primary cleaner cells (Bank C). In this way sylvite values that would otherwise be lost in the tailings are recovered as a part of the cleaner concentrate.

The concentrate from the primary cleaner cells is passed to a retention tank to which a saturated KCl brine is added for the purpose of upgrading this concentrate through solution of residual halite particles that may have been carried over in the concentrate. As shown, the thus treated concentrate from the cleaner operation is then joined with the oversize concentrate from Bank A and passed to a concentrate distributor from which it is fed to Bird centrifugals for de-watering, then dried and screened to form a coarser and a finer finished product. The coarser concentrate may be sold at a premium price as a "coarse" grade of potash. Even though the concentrate recovered from the cleaner operation is a relatively fine product its greater uniformity makes it a very satisfactory product for many purposes and it is sometimes referred to in the trade and sold as a "uniform" grade of potash.

Although the invention has been described above in reference to Fig. 2 as including both separate conditioning and separate flotation of the finer and coarser fractions obtained in the preliminary desliming steps, it is to be understood that it permits various modifications. For example, the separate conditioning step may be omitted, in which case the separate fractions of the feed will be recombined and then conditioned and floated through a single bank of rougher cells. Alternatively, separate conditioning may be employed and the separately conditioned fractions then recombined and passed through a single bank of rougher cells. In either of these situations a similar advantage is realized as is outlined above in describing the full flow sheet operation of Fig. 2 when the rougher concentrate is screened to separate out a coarse fraction; that is to say, the coarse fraction of the concentrate will be of sufficiently high grade so that it may be passed directly to the de-watering and drying stages, thus reducing the load that is imposed on the cleaner flotation cells and, what is of further importance, reducing the amount of water or KCl brine required to be supplied to the system for the upgrading treatment in the retention tank and for transferring the cleaner concentrate therefrom in the form of a slurry to the centrifugals for de-watering. Likewise, there is brought about a similar increase in the proportion of the sylvite recovered as a coarse high grade concentrate.

It is believed that the dry impact crushing step, with the ore passed in a closed circuit from the crusher over a screen and back to the crusher until it has been reduced to the predetermined size for the subsequent wet treatment, is a novel procedure as applied to potash ores and in fact as applied to any ore, and these steps are being claimed broadly as well as specifically in combination with the treatment steps leading to a froth flotation separation of the potash values.

It will be understood that various changes other than those that have been mentioned above may be made in the details of the process without departing from the scope of the invention, which is not to be deemed as limited otherwise than as indicated by the appended claims.

We claim:

1. The improvement in the recovery of potash values from sylvite-containing potash ores by froth flotation which comprises subjecting the ore in the final flotation feed size-reduction stage to substantially only dry impact crushing, dry screening the ore discharge from the crusher to separate therefrom particles reduced to flotation feed size and recycling the oversize particles to the crusher for further crushing, thereafter pulping the ore with a brine containing sylvite and halite, then scrubbing and mechanically desliming the ore while in the form of a pulp in said brine, then conditioning the ore for a froth flotation separation and thereafter subjecting the conditioned ore to a froth flotation separation of the sylvite and the gangue particles.

2. The improvement in the recovery of potash values from sylvite-containing potash ores by froth flotation which comprises subjecting the ore in the final flotation feed size-reduction stage to substantially only impact crushing in the dry way, dry screening the ore discharge from the crusher to separate therefrom particles reduced to flotation feed size while recycling the oversize particles to the crusher for further crushing, thereafter pulping the ore with a brine containing sylvite and halite and scrubbing the ore to promote freeing of clay impurities from attachment to the ore particles, then subjecting the scrubbed ore to a succession of wet gravity separation treatments wherein the coarser particles are withdrawn as an underflow discharge from the treatment zone and the finer particles are withdrawn as an overflow, subjecting the overflows from the gravity separation treatments to further hydroseparation treatments separately from the coarser fraction of the feed to separate ore and clay slimes therefrom as an overflow, and thereafter conditioning and floating the thus treated coarser and finer fractions of the ore to recover the sylvite values thereof.

3. The process according to claim 2 wherein the deslimed coarse and finer fractions of the ore feed are separately conditioned and separately floated to recover a relatively coarse sylvite concentrate product and a finer sylvite concentrate product.

4. The improvement in the recovery of potash values from sylvite-containing potash ores by froth flotation which comprises subjecting the ore in the final flotation feed size-reduction stage to substantially only dry impact crushing, dry screening the ore discharge from the crusher to separate therefrom particles reduced to flotation feed size, subjecting the particles retained on the screen to further impact crushing followed by dry screening to separate particles reduced to flotation feed size, thereafter pulping the thus prepared ore feed with a brine containing sylvite and halite and scrubbing the ore to promote freeing of clay impurities from attachment to the ore particles, then subjecting the scrubbed ore to a succession of wet gravity separation treatments wherein the coarser particles are withdrawn as underflow discharges from the treatment zones and the finer particles are withdrawn as overflows, then conditioning the ore fractions for a froth flotation separation and thereafter subjecting the conditioned ore to a froth flotation separation of the sylvite and gangue particles.

5. The improvement in the recovery of potash values from sylvite-containing potash ores by froth flotation which comprises subjecting the ore in the final flotation feed size-reduction stage to substantially only dry impact crushing, dry screening the ore discharge from the crusher to separate therefrom particles reduced to flotation feed size, subjecting the particles retained on the screen to further impact crushing followed by dry screening to reduce them to flotation feed size, pulping the thus prepared ore feed with a brine containing sylvite and halite and scrubbing the ore to promote freeing of clay impurities from attachment to the ore particles, subjecting the scrubber ore to a succession of wet gravity separation treatments wherein the coarser particles are withdrawn as underflow discharges from the treatment zones and the finer particles are withdrawn as overflows, combining the finer particle overflows and subjecting same to successive hindered settling treatments wherein slimes are withdrawn from the treatment zone in an overflow and the bulk of said finer particles is withdrawn as an underflow, subjecting the finer particles recovered in the final stage of said treatments to a partial de-watering, thereafter conditioning the coarser particles and the finer particles recovered in said respective underflows for a froth flotation separation, and thereafter subjecting the conditioned ore to a froth flotation separation of the sylvite and gangue particles.

6. The improvement in the recovery of potash values from sylvite-containing potash ores by froth flotation which comprises subjecting the ore in the final flotation feed size-reduction stage to substantially only dry impact crushing, dry screening the ore discharge from the crusher to separte therefrom particles reduced to flotation feed size, subjecting the particles retained on the screen to further impact crushing followed by dry screening to reduce them to flotation feed size, pulping the thus prepared ore feed with a brine containing sylvite and halite and scrubbing the ore to promote freeing of clay impurities from attachment to the ore particles, subjecting the scrubbed ore to a wet gravity separation treatment wherein the ore feed is separated into a coarser fraction comprising primarily plus 28 mesh particles and a finer fraction comprising primarily minus 28 mesh particles, subjecting the coarser fraction to a further wet classifying treatment wherein substantially all remaining minus 28 mesh particles are separated out into the overflow, thereafter separately conditioning the coarser fraction for froth flotation and separately floating same to obtain a relatively coarse sylvite concentrate substantially free from halite impurities.

7. The improvement in the recovery of potash values from sylvite-containing potash ores by froth flotation which comprises subjecting the ore in the final flotation feed size-reduction stage to substantially only dry impact crushing, dry screening the ore discharge from the crusher to separate therefrom particles reduced to flotation feed size, subjecting the particles retained on the screen to further impact crushing to reduce them to flotation feed size, pulping the thus prepared ore feed with a brine containing sylvite and halite and scrubbing the ore to promote freeing of clay impurities from attachment to the ore particles, subjecting the scrubbed ore to a wet gravity separation treatment wherein the ore feed is separated into a coarser fraction consisting primarily of plus 28 mesh particles and a finer fraction consisting primarily of minus 28 mesh particles, subjecting the coarser fraction to a further wet classifying treatment wherein substantially all remaining minus 28 mesh particles are separated out into the overflow, subjecting the finer fractions from said separation treatments to a further wet gravity separation treatment wherein ore particles and clay slimes of a particle size minus 270 mesh are passed off as the overflow and the remainder of the finer fraction is recovered in the form of a partially de-watered pulp and thereafter conditioning and floating the coarser fraction and said treated finer fraction.

8. The improvement in the recovery of potash values from sylvite-containing potash ores by froth flotation which comprises subjecting the ore in the final flotation feed size-reduction stage to substantially only dry impact crushing, dry screening the ore discharge from the crusher to separate therefrom particles reduced to flotation feed size, subjecting the particles retained on the screen to further impact crushing to reduce them to flotation feed size, pulping the thus prepared ore feed with a brine containing sylvite and halite and scrubbing the ore to promote freeing of clay impurities from attachment to the ore particles, subjecting the scrubbed ore to a wet gravity separation treatment wherein the ore feed is separated into a coarser fraction consisting primarily of plus 28 mesh particles and a finer fraction consisting primarily of minus 28 mesh particles, subjecting the coarser fraction to a further wet classifying treatment wherein substantially all remaining minus 28 mesh particles are separated into the overflow, subjecting the finer fractions from said separation treatments to a succession of further wet gravity separation treatments wherein ore particles and clay slimes of a particle size minus 270 mesh are passed off as the overflow and the remainder of the finer fraction is recovered in the form of a partially de-watered pulp, and thereafter separately conditioning and floating said coarser and finer fractions.

9. The improvement in the recovery of potash values from sylvite-containing potash ores by froth flotation which comprises subjecting the ore in the final flotation feed size-reduction stage to substantially only dry impact crushing, dry screening the ore discharge from the crusher to separate therefrom particles reduced to flotation feed size, subjecting the particles retained on the screen to further impact crushing to reduce them to flotation feed size, thereafter pulping the thus prepared ore feed with a brine containing sylvite and halite and scrubbing the ore to promote freeing of clay impurities from attachment to the ore particles, then subjecting the scrubbed ore to a succession of wet gravity separation treatments wherein the coarser particles are withdrawn as underflow discharges from the treatment zones and the finer particles are withdrawn as overflows, combining the finer particle overflows and subjecting same to successive hindered settling treatments wherein slimes are withdrawn from the treatment zone in an overflow and the bulk of said finer particles is withdrawn as an underflow, thereafter separately conditioning the coarser particle fraction and the finer particle fraction and passing said conditioned fractions of the feed through separate banks of flotation cells to effect a rougher flotation, screening the concentrate from the coarser fraction to effect a further separation between the coarser and finer particles thereof, subjecting said finer particles and the concentrate from the rougher flotation of said finer fraction to a cleaning flotation, subjecting the tails from the cleaning flotation to a wet cyclone separation treatment wherein the finer particles are separated as the overflow and the coarser particles are separated as an underflow, subjecting the underflow to a further flotation separation and recycling the concentrate fraction from this further flotation step to the cleaning flotation step for retreatment along with the feed of finer ore particles being fed thereto.

10. The improvement in the recovery from sylvinite ores of potash values from a flotation feed which comprises subjecting said ore in the final flotation feed size-reduction stage to substantially only dry impact crushing, subjecting said crushed ore to a rougher flotation, subjecting the concentrate from a rougher flotation to a wet screening operation to separate therefrom a coarser fraction substantially free of halite particles, subjecting the screen undersize finer fraction to said cleaning flotation and subjecting the tails from the cleaning flotation to a wet gravity cyclone type wet separation into a finer portion and a coarser portion, subjecting the coarser portion to a further flotation separation with recycling of the concentrates therefrom to the cleaning flotation step for retreatment.

11. The improvement in the preparation of sylvinite ores for a separation of the sylvite from the halite and clay impurities which comprises subjecting the ore in the final flotation feed size-reduction stage to substantially only impact crushing in the dry way, dry screening the ore discharge from the crusher to separate therefrom all particles reduced to flotation feed size and recycling the oversize particles to the crusher for further crushing, thereafter pulping the ore with a brine containing sylvite and halite and scrubbing the ore to promote freeing of clay impurities from attachment to the ore particles, then subjecting the scrubbed ore to a succession of wet gravity separation treatments wherein the coarser particles are withdrawn as an underflow discharge from the treatment zone and the finer particles are withdrawn as an overflow, and subjecting the overflows from the gravity separation treatments to further hydroseparation treatments separately from the coarser fraction of the feed to separate ore and clay slimes therefrom as an overflow.

12. The improvement in the preparation of sylvite-containing potash ores for wet separation of the potash values from the gangue constituents which comprises subjecting the ore in the final size-reduction stage to substantially only dry impact crushing to produce the desired size for the wet separation treatment.

13. The improvement in the preparation of sylvite-containing potash ores for a wet separation of the potash values from the gangue constituents which comprises successively subjecting the ore in the final size-reduction stage to substantially only dry impact crushing and screening to separate out particles reduced to the desired wet treatment size and repeating the dry impact crushing step on the coarser particles while passing them in a closed circuit through the crushing and screening stages of the treatment.

References Cited in the file of this patent

UNITED STATES PATENTS

| | | |
|---|---|---|
| 2,330,479 | Erickson | Sept. 28, 1943 |
| 2,340,523 | Ferris | Feb. 1, 1944 |
| 2,420,476 | Greene et al. | May 13, 1947 |
| 2,596,407 | Jackson | May 13, 1952 |
| 2,706,559 | Duke | Apr. 19, 1955 |
| 2,721,657 | Smith et al. | Oct. 25, 1955 |
| 2,745,547 | Wrege | May 15, 1956 |
| 2,806,598 | Brown | Sept. 17, 1957 |
| 2,849,113 | Bourne et al. | Aug. 26, 1958 |

OTHER REFERENCES

White et al.: Chemical Engineering Progress, volume 46, closure 10, page 528, Oct. 5, 1950.